United States Patent
Rodríguez Tsouroukdissian

(10) Patent No.: US 9,115,696 B2
(45) Date of Patent: Aug. 25, 2015

(54) DIRECT DRIVE WIND TURBINE AND METHOD FOR CONTROLLING AN AIR GAP

(75) Inventor: Arturo Rodríguez Tsouroukdissian, Barcelona (ES)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 0 days.

(21) Appl. No.: 13/814,447

(22) PCT Filed: Aug. 5, 2011

(86) PCT No.: PCT/EP2011/063544
§ 371 (c)(1),
(2), (4) Date: Feb. 5, 2013

(87) PCT Pub. No.: WO2012/017084
PCT Pub. Date: Feb. 9, 2012

(65) Prior Publication Data
US 2013/0134712 A1 May 30, 2013

(30) Foreign Application Priority Data

Aug. 6, 2010 (EP) .................................. 10382221

(51) Int. Cl.
F03D 11/02 (2006.01)
F03D 7/02 (2006.01)
F03D 9/00 (2006.01)

(52) U.S. Cl.
CPC .............. *F03D 7/0296* (2013.01); *F03D 9/002* (2013.01); *F03D 11/028* (2013.01); *F05B 2260/96* (2013.01); *Y02E 10/722* (2013.01)

(58) Field of Classification Search
CPC ........................................................ F03D 11/04
USPC ................................................................ 416/1
See application file for complete search history.

(56) References Cited

U.S. PATENT DOCUMENTS

| | | | |
|---|---|---|---|
| 5,018,606 A | * | 5/1991 | Carlson ....................... 188/267.1 |
| 6,279,700 B1 | * | 8/2001 | Lisenker et al. ........... 188/267.1 |
| 6,311,810 B1 | * | 11/2001 | Hopkins et al. ............ 188/267.2 |
| 7,051,849 B2 | * | 5/2006 | Browne et al. ................ 188/267 |
| 7,413,063 B1 | * | 8/2008 | Davis .......................... 188/267.1 |
| 7,772,741 B1 | * | 8/2010 | Rittenhouse .................. 310/257 |
| 2007/0017758 A1 | * | 1/2007 | Or et al. ..................... 188/267.2 |
| 2012/0076652 A1 | * | 3/2012 | Ventzke et al. .................... 416/1 |

FOREIGN PATENT DOCUMENTS

| | | | |
|---|---|---|---|
| DE | 100 44262 | 3/2002 | |
| EP | 1 657437 | 5/2006 | |
| EP | 2 014917 | 1/2009 | |
| EP | 2 157314 | 2/2010 | |
| GB | 2111171 A | * 6/1983 | ................ F16F 9/50 |
| WO | WO 01/59296 | 8/2001 | |
| WO | WO 2005/103489 | 11/2005 | |

* cited by examiner

*Primary Examiner* — Joseph Waks
(74) *Attorney, Agent, or Firm* — Squire Patton Boggs (US) LLP

(57) ABSTRACT

A direct drive wind turbine has a a rotor and a generator. The rotor includes a hub and a plurality of blades rotatably mounted on a frame. The generator includes a generator rotor and a generator stator. There are one or more dampers arranged between the rotor and the generator rotor and extending at least partially in an axial direction.

11 Claims, 3 Drawing Sheets

DIRECT DRIVE WIND TURBINE AND METHOD FOR CONTROLLING AN AIR GAP

The present invention relates to a wind turbine, and more particularly to a direct drive wind turbine. The present invention furthermore relates to a method for controlling an air gap, and more particularly to such a method in a direct drive wind turbine.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft drives the generator rotor either directly ("directly driven") or through the use of a gearbox. Direct driven wind turbines also may be "shaftless"; in these shaftless wind turbines, the rotor directly drives the generator.

Direct drive wind turbines such as known from e.g. WO 2005/103489, do not suffer from known problems related to the gearbox. However, since there is no speed increase, the generator shaft rotates very slowly. As a consequence, a large and relatively expensive generator is generally needed to be able to generate electricity in an effective way. Additionally, when bending loads and movements (and corresponding deformations) are transmitted through the rotor shaft to the generator, it may not be possible to control the air gap between generator rotor and generator stator. High bending loads can even cause structural damage to parts of the generator, e.g. its bearings. Replacement or repair of such generator parts may be very expensive due to the size and related cost of the generator and its components.

WO 01/59296 discloses a direct drive wind turbine comprising a hub with a plurality of blades, the hub being rotatably mounted relative to an axle part. The hub of the turbine is connected to the generator rotor by means of a plurality of connecting members, which are torsion stiff but yielding to bending moment.

With this kind of configuration the loads due to the weight of hub and blades are transmitted more directly via the frame to the tower, whereas the rotor transmits mainly torque to the generator, thus substantially reducing undesired deformations in the generator. This may represent an improvement with respect to other prior art wind turbines, but the transmission of bending loads from the rotor to the generator cannot be avoided entirely.

There thus still exists a need for a direct drive wind turbine, wherein the transfer of bending loads and movements from the rotor hub to the generator can substantially be reduced. There also still exists a need for a direct drive wind turbine in which an air gap can be more effectively controlled, particularly under extreme load cases such as those resulting from e.g. wind gusts.

It is an objective of the present invention to at least partially fulfil these needs. Further advantages of the present invention will become apparent from its description.

SUMMARY OF THE INVENTION

In a first aspect, the present invention provides a direct drive wind turbine comprising a rotor and a generator, the rotor comprising a hub and a plurality of blades and being rotatably mounted on a frame, and the generator comprising a generator rotor and a generator stator, further comprising one or more dampers arranged between the rotor and the generator rotor and extending at least partially in an axial direction. Because of the rotor being rotatably mounted on a frame, the transmission of bending loads to the generator rotor may be reduced, thus making it easier to control the air gap. Additionally, the generator rotor may have a lighter design since the loads that it has to support may be reduced. And by providing a damper that at least partially dissipates the energy of a bending movement of the hub, the resulting movement or deformation of a generator rotor may be reduced. In this sense, the axial direction is defined by the axis of rotation of the rotor (which would normally correspond to the axis of rotation of the generator rotor).

In some embodiments, one or more dampers may be passive. In some embodiments, one or more dampers may be semi-active. In some embodiments, one or more dampers may be active. Any kind of damper (e.g. hydraulic, pneumatic, solid friction, rotational inertia-viscous dampers, rotational friction dampers etc.) may be used within the scope of the present invention.

A passive damper system generally has a non-variable (constant) damping coefficient. In a semi-active damper system, the damping coefficient may be varied with a control system. In an active damper system, the damper is actively steered, e.g. by increasing or decreasing pressure in a fluid chamber. A semi-active damper system may be formed e.g. by a variable-orifice viscous damper, a variable stiffness damper, a variable-friction damper or a controllable fluid damper. A preferred controllable fluid damper is a magnetorheological fluid damper. In magnetorheological fluid dampers, the damper fluid contains metallic particles. The damper's damping coefficient can be controlled very quickly by an electromagnet. A control system may thus send control signals to an electro-magnet which can increase or decrease the damping coefficient. An aspect of semi-active and active dampers is that they may be controlled to adapt to instantaneous load conditions. For example, under a high or sudden aerodynamic load, the dampers' damping coefficient may be suitably adapted.

Another controllable fluid damper that may advantageously be used is e.g. an electrorheological fluid damper. Electrorheological fluids are suspensions of fine particles in an electrically insulating fluid. The viscosity of these fluids may be changed reversibly and very quickly in response to an electric field. In such a damper, the friction coefficient can thus be varied by applying an electric field.

In one aspect of the invention, within the same wind turbine, a hybrid system comprising a combination of passive and semi-active or active dampers may be provided.

In embodiments comprising one or more semi-active or active dampers, a wind turbine may comprise one or more sensors, wherein data collected by said sensors is used in the control of the semi-active or active dampers.

In embodiments, the dampers may be attached to the rotor and/or generator rotor with friction joints. Friction joints may allow some relative movement between the hub and generator rotor and may reduce loads to be supported by the damper. In a similar manner, in some embodiments, the dampers may be attached to the rotor and/or generator rotor with ball-socket joints.

In some embodiments, the dampers may also extend in a substantially radial direction. Depending on the design of the rotor and of the generator, the dampers may also be arranged partially in a radial direction. The dampers may e.g. be attached at the rotor hub, at root extenders (if present) and could also be attached at the rotor blades.

In another aspect, the invention also provides a method of controlling an air gap in a wind turbine as substantially hereinbefore described, comprising measuring or predicting an acceleration of the rotor using at least one sensor, and actuating at least one damper to reduce the transfer of a bending movement from the rotor to the generator rotor.

In some implementations, an acceleration of the rotor is measured with a triaxial accelerometer mounted on the hub. An acceleration of the hub may also be indirectly measured with a sensor for determining the movement (and activity) of a damper. One or more dampers may comprise such sensors. In some implementations, an acceleration of the rotor may be predicted indirectly using a LIDAR system for predicting an aerodynamic load.

In some implementations, actuating at least one damper may comprise actuating at least one damper differently than another damper. Different actuations of the separate dampers may be useful in certain asymmetric load cases.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

Figure 1:
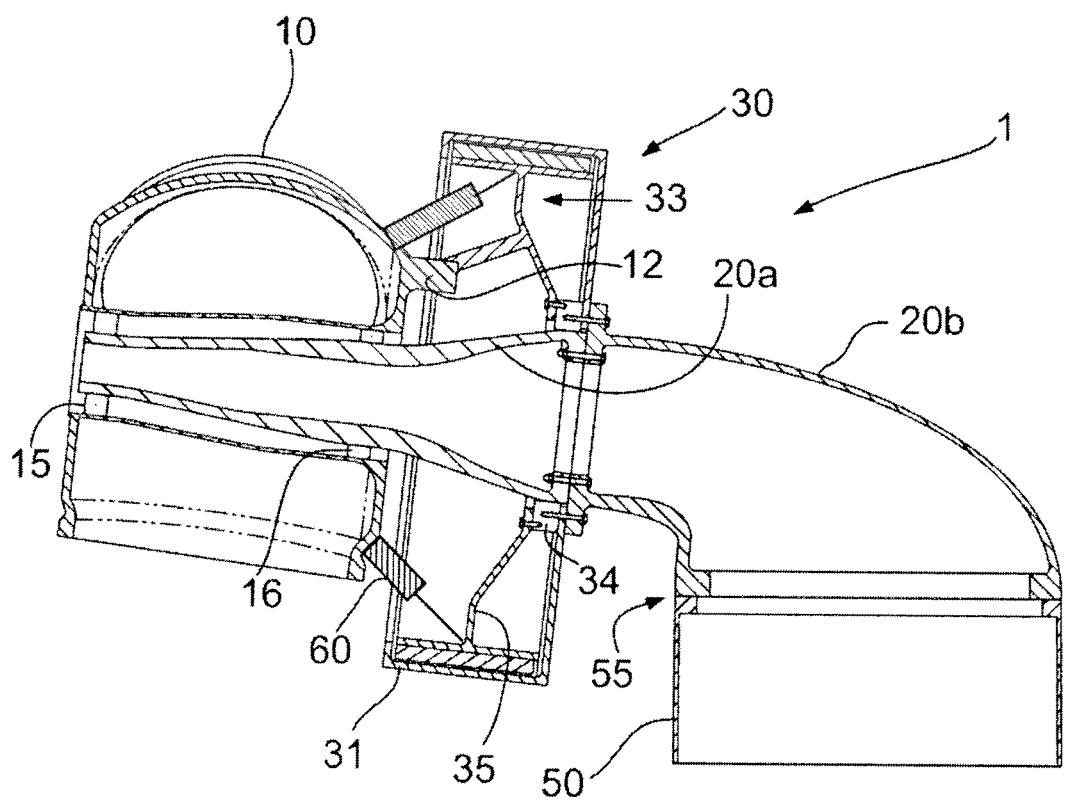
FIG. 1 schematically illustrates a first embodiment of a wind turbine according to the present invention.

FIG. 1 illustrates a first embodiment of a wind turbine 1 according to the present invention. Wind turbine 1 comprises a tower 50 upon which a frame 20 is rotatably mounted. In this embodiment, frame 20 comprises two separate sections: a front frame 20a and a rear frame 20b. Reference sign 55 indicates the presence of a yaw mechanism, which allows rear frame 20b to be rotated around the longitudinal axis of the wind turbine tower. Rear frame 20b and front frame 20a may comprise inward annular flanges. In the embodiment shown, bolts are used to connect these flanges.

Rotor hub 10 is rotatably mounted on front frame 20a through bearings 15 and 16. Rotor hub 10 carries a plurality of blades (not shown). A generator 30 is also mounted on frame 20. Generator housing 31 is connected through bolts to an annular flange provided on rear frame 20b. Schematically indicated with reference sign 34 is a suitable bearing, rotatably supporting a generator rotor 33. Any suitable bearing may be used, for example a rolling element bearing such as e.g. a double-tapered roller bearing.

Generator rotor 33 comprises (electro)magnetic means, which may include but are not limited to e.g. permanent magnets or windings. These (electro)magnetic means are carried by a generator rotor's carrying structure 35, which is provided around bearing 34 and thus can rotate with respect to the generator stator.

A protrusion 12 is integrally formed with hub 10. The protrusion 12 may be flexibly coupled to generator rotor carrying structure 35, thus limiting the transfer of bending loads. Flexibly coupled in this sense means that the coupling will yield ("give in") relatively easily under loads in at least one direction. In preferred embodiments, the couplings yield at least in an axial direction, so that an axial movement of the rotor with respect to the generator is possible.

In some embodiments, elements of flexible materials may be arranged between the protrusions 12 and parts of the generator rotor's carrying structure. These flexible elements may be made from any suitable material, e.g. elastic or elastomer materials, or combinations of metals with elastomers or yet other suitable materials. Other or additional flexible couplings may also be used; the couplings may obtain their flexible properties due to their shape, material, positioning, mounting or combinations of these.

In some embodiments, this connection may also be more rigid.

A plurality of dampers 60 is mounted between the rotor and the generator rotor. In the embodiment shown, dampers are mounted between the hub 10 and carrying structure 35 of the generator rotor and extend axially and substantially radially. In other embodiments, the dampers may e.g. be mounted at extenders mounted on the hub or even at the blades. The dampers may be most effective when they are arranged in such a manner that the prevailing bending movements of the hub are locally directed in the longitudinal direction of the dampers.

In the embodiment of FIG. 1, the dampers may be e.g. passive hydraulic or pneumatic dampers. When the hub is subjected to a bending load, it may perform a bending movement which may be transmitted to the generator rotor through protrusions 12 and their connection to the generator rotor. The dampers can dissipate at least a part of the energy contained in the bending movement of the hub and thus limit the resulting movement and loads in the generator rotor. The air gap between the generator rotor and generator stator may thus be more effectively controlled.

With passive dampers, no further actuation is necessary during operation of the wind turbine. Appropriate damping coefficients may be determined in accordance with prevailing load cases and e.g. eigenmodes and eigenfrequencies.

Figure 2A:
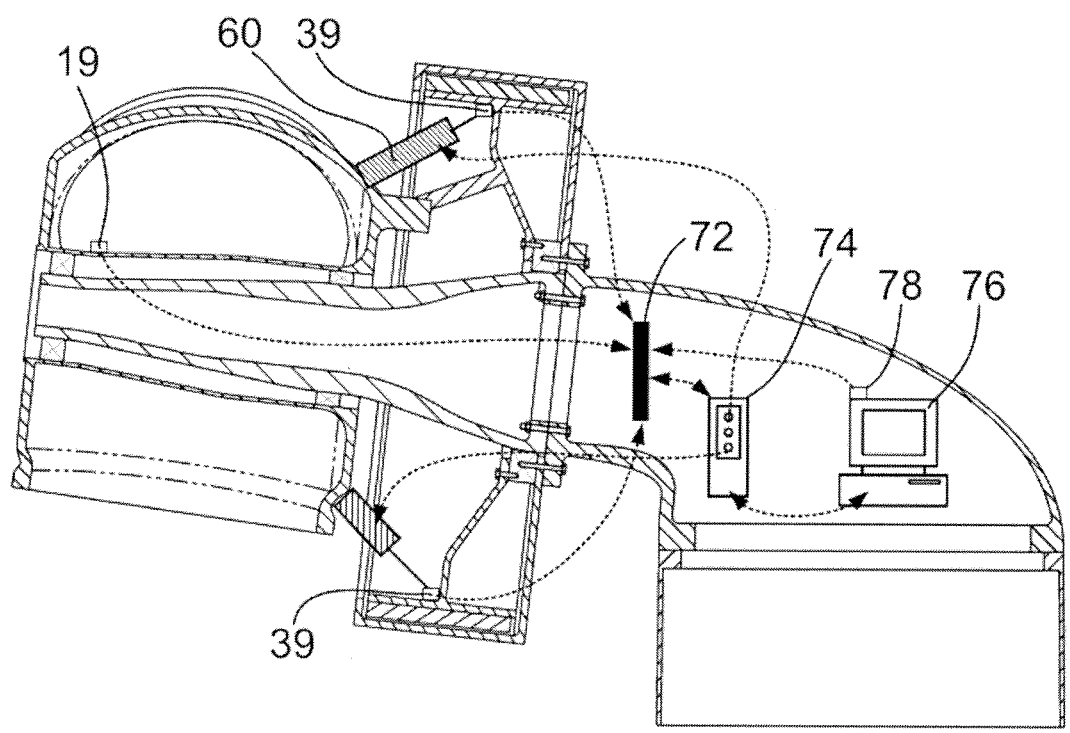
FIG. 2a schematically illustrates a second embodiment of a wind turbine according to the present invention.

FIG. 2a illustrates a similar wind turbine as in FIG. 1, but a plurality of semi-active or active dampers 60 is provided. In order to control the dampers in such a way as to keep the air gap substantially constant, one or more sensors may be provided in the wind turbine.

In the embodiment of FIG. 2a, a tri-axial accelerometer 19 is provided in the hub 10. Additionally, sensors 39 are provided on the dampers for registering the activity of the dampers. These sensors 39 may e.g. be load cells, proximity probes or linear potentiometers. Further, data collected by a LIDAR 78 concerning instantaneous wind flows may also be used in the control of the dampers.

Data collected by each of the sensors is communicated to bus 72 which is in communication with an Input/Output-element 74. I/O element 74 sends the data to a schematically indicated control system 76. The control system calculates control commands based on the input data. The control commands may be sent from I/O element 74 to each of the dampers 60.

Figure 2B:
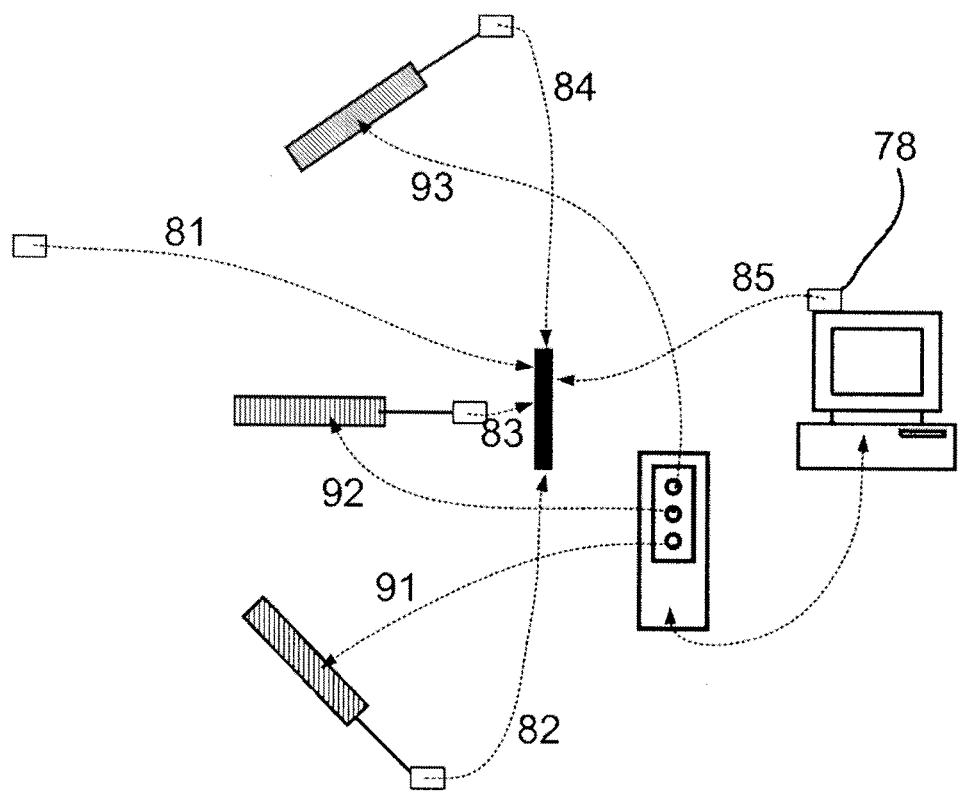
FIG. 2b schematically illustrates a method of controlling an air gap in accordance with an embodiment of the present invention.

With reference to FIG. 2b, input signals 81, 82, 83, 84 and 85 may be sent to bus 72. Command signals 91, 92 and 93 may be sent to the three dampers. In this embodiment, data is collected from a LIDAR, an accelerometer on the hub and sensors at the dampers. In other embodiments, only some of these sensors may be used. In further embodiments, also alternative sensors may be used. For example, a sensor may also be connected to frame 20 to register bending loads or deformations. The communication between sensors, dampers and control system may be through wires/cables or may be wireless.

In some embodiments, and for certain load cases it may be beneficial to combine the control of the dampers with e.g. pitch control in order to control the air gap.

It will be clear that merely one possible control system was illustrated in FIGS. 2a and 2b. Alternative control systems may also be used. Also, in further embodiments, different numbers of dampers may be used. The provision of three or more equispaced dampers has the advantage of being dynamically balanced. However, in some embodiments only one or two dampers can be provided.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described before, but should be determined only by a fair reading of the claims that follow.

The invention claimed is:

1. A direct drive wind turbine, comprising a rotor configured to rotate around a rotational axis and a generator, the rotor comprising a hub and a plurality of blades and being rotatably mounted on a frame, and the generator comprising a generator rotor and a generator stator, the rotational axis of the rotor defining an axial direction, wherein
the rotor hub includes a plurality of protrusions coupled to the generator rotor through a plurality of couplings, wherein the couplings are configured to transmit torque from the rotor hub to the generator rotor and to yield under loads in the axial direction, and
the wind turbine further comprising:
one or more dampers, disposed separately from the plurality of couplings, arranged between the rotor and the generator rotor and extending at least partially in the axial direction.

2. A direct drive wind turbine according to claim 1, wherein at least one damper is passive.

3. A direct drive wind turbine according to claim 1, wherein at least one damper is semi-active.

4. A direct drive wind turbine according to claim 3, wherein said at least one semi-active damper is a magnetorheological or an electrorheological damper.

5. A direct drive wind turbine according to claim 3, further comprising one or more sensors, wherein data collected by the sensors is used in the control of the semi-active dampers.

6. A direct drive wind turbine according to claim 1, wherein at least one damper is an active damper.

7. A direct drive wind turbine according to claim 6, further comprising one or more sensors, wherein data collected by the sensors is used in the control of the active dampers.

8. A direct drive wind turbine according to claim 1, wherein the dampers also extend in a substantially radial direction.

9. A direct drive wind turbine, comprising:
a rotor and a generator, the rotor comprising a hub and a plurality of blades and being rotatably mounted on a frame, and the generator comprising a generator rotor and a generator stator,
the rotor hub including a plurality of protrusions coupled to the generator rotor through a plurality of couplings,
wherein the couplings are configured to transmit torque from the rotor hub to the generator rotor and to yield under loads in the axial direction, and
the wind turbine further comprising:
one or more semi-active or active dampers, disposed separately from the couplings, arranged between the rotor and the generator rotor and extending at least partially in an axial direction,
one or more sensors to measure or predict an acceleration of the rotor, and
a control system adapted to actuate the one or more semi-active or active dampers to reduce the transfer of a bending movement from the rotor to the generator rotor based on data collected by the one or more sensors.

10. A direct drive wind turbine, comprising:
a rotor and a generator, the rotor comprising a hub and a plurality of blades and being rotatably mounted on a frame, and the generator comprising a generator rotor and a generator stator, further comprising
a damper arranged between the rotor and the generator rotor and extending at least partially in an axial direction, wherein
the damper is attached to the rotor and/or generator rotor with a ball-socket joint.

11. A direct drive wind turbine, comprising:
a rotor and a generator, the rotor comprising a hub and a plurality of blades and being rotatably mounted on a frame, and the generator comprising a generator rotor and a generator stator, further comprising
a damper arranged between the rotor and the generator rotor and extending at least partially in an axial direction, wherein
the damper is attached to the rotor and/or generator rotor with a friction joint.

* * * * *

UNITED STATES PATENT AND TRADEMARK OFFICE
CERTIFICATE OF CORRECTION

PATENT NO. : 9,115,696 B2
APPLICATION NO. : 13/814447
DATED : August 25, 2015
INVENTOR(S) : Rodriguez Tsouroukdissian Page 1 of 1

It is certified that error appears in the above-identified patent and that said Letters Patent is hereby corrected as shown below:

On the title page item [56], insert as follows

-- US 2008/0012346 --

Signed and Sealed this
Nineteenth Day of January, 2016

Michelle K. Lee
*Director of the United States Patent and Trademark Office*